(12) United States Patent
Chen et al.

(10) Patent No.: US 10,155,841 B2
(45) Date of Patent: Dec. 18, 2018

(54) CURING AGENT COMPOSITION

(71) Applicants: DOW GLOBAL TECHNOLOGIES LLC, Midland, MI (US); DOW CHEMICAL (CHINA) INVESTMENT COMPANY LIMITED, Shanghai (CN)

(72) Inventors: CuiPing Chen, Shanghai (CN); Yi Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/037,200

(22) PCT Filed: Nov. 26, 2013

(86) PCT No.: PCT/CN2013/087849
§ 371 (c)(1),
(2) Date: May 17, 2016

(87) PCT Pub. No.: WO2015/077918
PCT Pub. Date: Jun. 4, 2015

(65) Prior Publication Data
US 2016/0289369 A1 Oct. 6, 2016

(51) Int. Cl.
C08G 59/62 (2006.01)
C08G 59/50 (2006.01)
C08G 59/56 (2006.01)
C08L 63/00 (2006.01)

(52) U.S. Cl.
CPC ........... *C08G 59/621* (2013.01); *C08G 59/50* (2013.01); *C08G 59/56* (2013.01); *C08L 63/00* (2013.01)

(58) Field of Classification Search
CPC ...... C08G 59/621; C08G 59/50; C08G 59/56; C08L 63/00
USPC .......................................... 523/400; 525/523
See application file for complete search history.

(56) References Cited

U.S. PATENT DOCUMENTS

| | | | |
|---|---|---|---|
| 5,266,620 A | 11/1993 | Shinoda et al. | |
| 8,497,387 B2 | 7/2013 | Marks et al. | |
| 8,512,594 B2 | 8/2013 | Walker et al. | |
| 2006/0089432 A1 | 4/2006 | Kawakami et al. | |
| 2008/0188591 A1 | 8/2008 | Raymond et al. | |
| 2009/0259003 A1 | 10/2009 | Walker et al. | |
| 2009/0298960 A1 | 12/2009 | Muenz et al. | |
| 2010/0048827 A1 | 2/2010 | Walker et al. | |
| 2010/0048954 A1 | 2/2010 | Vedage et al. | |
| 2010/0270495 A1 | 10/2010 | Arnaud et al. | |
| 2010/0298505 A1 | 11/2010 | Arnaud et al. | |
| 2010/0330335 A1 | 12/2010 | Ciupak et al. | |
| 2013/0091778 A1 | 4/2013 | Arnaud et al. | |
| 2014/0275446 A1* | 9/2014 | Kramer | C08G 59/182 525/523 |

FOREIGN PATENT DOCUMENTS

| | | | |
|---|---|---|---|
| CN | 101585958 A | 11/2009 | |
| EP | 1914257 A1 | 4/2008 | |
| EP | 2108668 A1 | 10/2009 | |
| FR | 1581068 A | 9/1969 | |
| JP | 2003147191 A | 5/2003 | |
| JP | 2004244430 A | 9/2004 | |
| JP | 2004346246 A | 12/2004 | |
| JP | 2010195998 A * | 9/2010 | ............. C08G 59/50 |
| JP | 2011213983 A | 10/2011 | |
| WO | 2000001659 | 1/2000 | |
| WO | 2009080209 A1 | 7/2009 | |
| WO | WO-2013068507 A1 * | 5/2013 | ........... C08G 59/182 |

OTHER PUBLICATIONS

Sugiyama, JP 2010-195998 A machine translation in Einglish, Sep. 9, 2010.*

* cited by examiner

*Primary Examiner* — David T Karst
(74) *Attorney, Agent, or Firm* — Karl E. Stauss; Cantor Colburn LLP

(57) ABSTRACT

A curing agent composition for curing an epoxy compound comprising a mixture of: (a) at least one natural oil phenol compound, (b) at least one phenolic resin compound, and (c) at least one amine curing agent; in particular, wherein the curing agent composition is adapted for providing a curable epoxy resin composition with a Shore D hardness build-up greater than 0 after within 2 hours at 23±2° C. and having an anti-blushing property such that 30 minutes after scratching a film cured on a glass panel, the film is at least 50 percent transparent; a curable composition including (I) at least one epoxy compound; and (II) the above curing agent composition, and a thermoset prepared from the above curable composition.

21 Claims, No Drawings

CURING AGENT COMPOSITION

FIELD

The present invention is related to a novel curing agent composition for curing epoxy resin compounds; to a curable epoxy resin formulation or composition including the novel curing agent composition; and to a thermoset prepared from the curable composition containing the novel curing agent composition.

BACKGROUND

Epoxide compounds are known to be used with a curing agent and other additives to form an epoxy resin curable formulation or composition which can subsequently be cured to form a cured product or thermoset. Such epoxy resin compositions can be used in various applications, for example in the composites and infrastructure industries. For use in composites and infrastructure applications, curable epoxy resin compositions generally require a fast cure to achieve effective production of a cured thermoset article.

Heretofore, various aliphatic amines such as diethylenetriamine (DETA) and cycloaliphatic amines such as aminoethylpiperazine (AEP) have been used in curable epoxy resin compositions to instill fast cure properties to the curable epoxy composition. However, curable epoxy compositions based on the above known amines often suffer from surface defects such as carbamation, often referred to as "blushing". The blushing problem leads to formation of a haze appearance in the resultant cured thermoset which is a big problem and an undesirable property for cured thermosets especially for use in the composites and infrastructure industries which require epoxy resin systems that provide a cured product that does not blush or does not exhibit a "greasy" (e.g., "sticky" or "tacky") surface.

Generally, the blushing phenomena can occur as the result of the active hydrogens on the known aliphatic amines and cycloaliphatic amines reacting with water ($H_2O$) and carbon dioxide ($CO_2$) components existing in air. The surface defects (e.g. blushing or carbamation) of thermoset articles detract from the appearance of the final thermoset article, and such defects can lead to the reduction of mechanical properties such as reduced glass transition temperature (Tg) or tensile strength due to the consumption of active hydrogen of the aliphatic amines and cycloaliphatic amines, i.e. blushing.

In the known art, some solutions to correct the above surface defects have been attempted. For example, sterically hindered amines such as trimethyl hexamethylene diamine (TMD) and polyetheramines such as Jeffamine™ can be used as substitutes for the known aliphatic amines and cycloaliphatic amines in curable epoxy resin compositions. However, the use of sterically hindered amines and other known materials such as polyether amines, generally results in other undesirable problems such reducing the curing speed of the curable composition, and/or lowering the thermo resistant properties of the curable composition. Furthermore, the current high cost of the known amines or the unique commercial resource of products such as TMD makes the known amines for use as curing agents in curable epoxy resin compositions highly undesirable.

Other known art provides various curable compositions with varying disadvantages. For example, JP2004346246A discloses a curable composition which includes an epoxy resin, an aliphatic tricarboxylic acid as a curing agent, and an organic solvent. The curable composition of JP2004346246A does not use an amine curing agent; therefore, the curable composition has low thermo resistance and low base resistance properties.

JP2004244430A discloses a water dispersible, epoxy group-containing polymer and a curing agent. The curing agent is a water-soluble aliphatic tricarboxylic acid. The curable composition of JP2004244430A does not use a specific phenol novolac as an accelerator; therefore, the curable composition has a slow hardness build-up property.

CN101585958A discloses a composition for preparing artificial stone including 100 parts of resin and 25-50 parts of a curing component, where the resin can be bisphenol F glycidyl ether, bisphenol F epoxy resin, and reactive diluents. The curing component is obtained by mixing non-reactive diluents, aliphatic amine, alicyclic amine, reactive diluents and polyetheramine.

FR1581068 discloses a hardener for an epoxide resin, where the hardener is an aromatic amine dissolved in a liquid phenol, the amine being 10% to 50% by weight. The curable composition of FR1581068 has a blushing problem.

Heretofore, phenalkamines or Mannich base products are known to be used in curable compositions. For example, US20090259003A1 discloses the use of Mannich base products of an aldehyde compound and a phenol compound. The curable composition of US20090259003A1 has an undesirable high viscosity.

WO200001659 discloses Mannich based reaction products-phenalkamines obtained by combing cardanol with at least aromatic or alicylic polyamine and at least one aldehyde compound. The curable composition of WO200001659 has an undesirable high viscosity.

WO2009080209A1 discloses a curing agent for epoxy resins, the curing agent including a phenalkamine blended with a salted polyamine or a salted polyamine-epoxy adduct. The curing agent described in WO2009080209A1 suffers from the disadvantage of having a high viscosity phenalkamine.

EP2108668A1 and EP1914257A1 disclose a composition including Mannich base derivatives of N,N'-dimethyl secondary diamine polymer. The amine-epoxy composition disclosed in EP2108668A1 and EP1914257A1 has a high viscosity phenalkamine.

Other curable compositions known in the art include, for example, a solvent-free ambient-temperature curable composition disclosed in US20060089432A1. The curable composition of US20060089432A1 does not use an epoxy resin; and therefore, the curable composition disadvantageously has limited application without an epoxy resin.

JP2003147191A discloses an aqueous-resin composition containing acetoacetic ester compound (A) and autoemulsified type amine curing agent (B). Disadvantageously, the composition of JP2003147191A cannot be used in conventional epoxy resin-related applications.

KR2010095529A discloses friction material-containing products such as clutch plates and brake shoes. The composition of KR2010095529A disadvantageously cannot be used in conventional epoxy resin-related applications.

US20090298960A1 discloses a composition containing an epoxy resin, a phenol compound (solid at room temperature), a polyether amine, a propellant (blowing gent), a curing agent and a filler for manufacturing structural foams. When the curable composition of US20090298960A1 uses a conventional aliphatic amine curing agent, the curable composition suffers from the disadvantage of blushing.

US20100048827A1 and US20100048954 disclose an amine composition used in manufacturing an article such as a coating. The amine composition comprises N,N'-dimethylmeta-xylylenediamine (DM-MXDA), at least one multifunctional amine having at least 3 active amine hydrogen, and optionally plasticizer or solvent. The amine composition of US20100048827A1 and US20100048954 suffers from the disadvantage of having high viscosity and slow hardness build-up properties.

JP2011213983A discloses a condensate obtained with condense polyamine, a phenol and an aldehyde. The condensate of JP2011213983A suffers from the disadvantage of having a high viscosity.

US20080188591A1 discloses curing agent compositions comprising the reaction product of alkylated polyalkyleneamine compounds and polyalkylene polyether polyol modified polyepoxide resins as waterborne amine-epoxy compositions. The curing agent compositions disclosed in US20080188591A1 suffer from the disadvantage of having a slow hardness build-up property.

US20100298505 discloses a liquid resin composition including a novolac resin, a reactive diluent and optionally a crosslinking agent. The crosslinking agent is chosen from compounds incorporating a hydroxyl or aldehyde functional group, heterocyclic compounds that have a structure incorporating a nitrogen atom and an oxygen atom separated by a carbon atom, nitroacetals and nitrones, tris(hydroxymethyl)nitromethane, glyoxal and 2,2-dimethoxyethanal. The composition of US20100298505 disadvantageously cannot be used in conventional epoxy resin-related applications.

US20100270495A1 discloses a thermally curable liquid resin composition for manufacturing abrasives that includes an epoxy resin having two epoxy groups and a reactive diluent. The composition includes a crosslinking agent chosen from compounds incorporating at least one amine, hydroxyl, aldehyde or carboxylic functional group, and heterocyclic compounds that have a structure incorporating a nitrogen atom and an oxygen atom separated by a carbon atom. The curable composition of US20100270495A1 suffers from the disadvantage of having a slow hardness build-up property.

What is needed in the epoxy industry is an epoxy curing agent and an epoxy curable formulation for manufacturing thermoset resin product, wherein the epoxy curable formulation, among other advantages, (1) has no problems with blushing, (2) has a balance of properties, and (3) is useful in composites and infrastructure applications.

SUMMARY

The present invention is directed to a curing agent composition useful for curing an epoxy compound. For example, the curing agent composition includes a mixture of: (a) at least one natural oil phenol compound such as at least one cardanol or cardol from a cashew nutshell oil compound, (b) at least one phenolic resin compound, and (c) at least one amine curing agent. The curing agent composition of the present invention is advantageously used as a curing agent additive in combination with an epoxy compound to form a curable epoxy resin composition.

Some of the benefits of using the curing agent composition of the present invention include, for example: (1) the curable epoxy resin composition containing the curing agent composition of the present invention has an extremely high cure speed at ambient temperature; (2) the curing agent composition of the present invention imparts better or improved anti-blushing properties to the curable epoxy resin composition; (3) when the curable epoxy resin composition is cured, the curable epoxy resin composition containing the curing agent composition of the present invention imparts better anti-blushing properties to the thermoset formed from such curable composition during curing of the curable composition when compared with other known curing agents; (4) the curing agent composition of the present invention provides a curable epoxy resin composition with low viscosity; and (5) the curable epoxy resin composition containing the curing agent composition of the present invention provides a thermoset with an improved Shore hardness build-up speed and tensile strength. For example, the curing agent composition of the present invention is adapted for providing a curable epoxy resin composition with a Shore D hardness build-up greater than 0 after within about 2 hours (hr) at 23±2° C.

Another embodiment of the present invention is directed to a curable epoxy resin composition including (I) at least one epoxy compound; and (II) at least one curing agent composition as described above.

Still another embodiment of the present invention is directed to a thermoset prepared from the above curable epoxy resin composition containing the curing agent composition of the present invention.

DETAILED DESCRIPTION

"Rapid cure" or "fast cure" herein means the time to build up a greater than about 0 Shore D hardness within about 2 hr for a 5 g sample with about a 3 cm thickness when cured at about 23° C.±2° C.

"Blushing" or "greasy surface" herein means the phenomenon of active hydrogens on primary amines and secondary amines reacting with $H_2O$ and $CO_2$ existing in air resulting in carbamation.

"Good anti-blushing" herein means that, about 30 minutes (min) after scratching a film cured on glass panel with about a 300 μm wet film, the wet film is at least about 50 percent (%) transparent.

"Low viscosity", with reference to a hardener, herein means a hardener viscosity below about 500 mPa·s at about 25° C.; and "low viscosity", with reference to a curable composition, herein means a viscosity below about 2000 mPa·s at about 25° C.

One embodiment of the present invention is directed to providing a curing agent formulation or composition including a mixture of the following components: (a) at least one natural oil phenol compound such as at least one cardanol or a cardol from cashew nutshell oil, (b) at least one phenolic resin compound, and (c) at least one amine curing agent. Other optional additives known to the skilled artisan can be included in the curing agent composition such as for example an accelerator or a catalyst and other additives for various enduse applications.

The natural oil phenol compound, useful as component (a) in preparing the curing agent composition of the present invention, may be composed of at least three different functional groups: (1) an aromatic ring, (2) at least one hydroxyl group attached to at least one position on the aromatic ring, and (3) an alkyl chain from C9-C20 attached to at least one position on the aromatic ring. The natural oil phenol compound, useful as component (a), may include for example, phenolic lipid, urushiol, cardol, cardanol or mixtures thereof. In one preferred embodiment, the natural oil phenol compound includes a cardanol or cardol from cashew nutshell oil, which can be for example compounds illustrated by Structures (I) and (II) as follows:

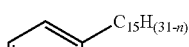

Structure (I)

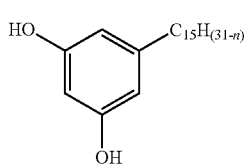

Structure (II)

where n, in Structures I and II above, can be equal to 0, 2, 4 or 6, which depends upon whether the side chain is saturated or unsaturated.

Generally, the amount of the natural oil phenol compound useful in the present invention such as cardanol or cardol compound, may be for example, from about 0.1 weight percent (wt %) to about 50 wt % in one embodiment, from about 1 wt % to about 40 wt % in another embodiment; from about 2 wt % to about 35 wt % in still another embodiment; and from about 5 wt % to about 30 wt % in yet another embodiment, based on the total weight of the curing agent composition. When the concentration of the natural oil phenol compound, such as cardanol or cardol compound, is less than about 0.1 wt %, the natural oil phenol compound cannot exhibit an anti-blushing performance. When the concentration of the natural oil phenol compound is greater than about 50 wt %, the natural oil phenol compound will phase separate after curing (i.e., the natural oil phenol compound, such as cardanol or cardol compound, will emerge on the surface of a cured clear casting).

The phenolic resin compound useful as component (b) for preparing the curing agent composition of the present invention may include, for example, a phenol novolac compound such as a phenol formaldehyde resin. In one embodiment, the phenol formaldehyde resin can be a synthetic polymer obtained by the reaction of phenol or a substituted phenol with formaldehyde. In another embodiment, the phenolic compound may also include, for example, resol novolac, phenol novolac, cresol novolac, bisphenol-A novolac, a multi-functional novolac, or mixtures thereof.

In one preferred embodiment, the phenol novolac compound useful in the present invention can be for example those compounds illustrated by Structure (III) as follows:

Structure (III)

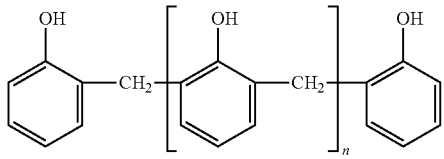

where, in Structure (III), n can be in the range of $1 < n \leq 2$.

The phenol novolac useful in the present invention generally has a melting point below about 80° C. in one embodiment; and the melting point may be for example, from about 20° C. to about 79° C. in another embodiment, from about 30° C. to about 75° C. in still another embodiment; and from about 40° C. to about 73° C. in yet another embodiment. A phenol novolac with a melting point higher than about 80° C. will form sediment after blending with the epoxy resin and curing agent.

Generally, the amount of phenolic novolac compound useful in the present invention, may be for example, from about 0.1 wt % to about 50 wt % in one embodiment, from about 1 wt % to about 45 wt % in another embodiment; from about 2 wt % to about 40 wt % in still another embodiment; and from about 5 wt % to about 35 wt % in yet another embodiment, based on the total weight of the curing agent composition. When the amount of phenolic novolac compound is less than about 0.1 wt %, a fast curing speed cannot be achieved; and when the amount of phenolic novolac compound is greater than about 50 wt %, the mechanical and thermo-resistant properties of the phenolic novolac compound can be adversely impacted.

In general, the amine curing agent, component (c), used to prepare the curing agent composition of the present invention may comprise, for example, any conventional amine curing agent known in the art useful for curing a curable composition. The curing agent, (also referred to as a hardener or cross-linking agent) useful in the curing agent composition, may include, for example, an aliphatic amine, a cycloaliphatic amine, an aromatic amine, a polycyclic amine, or a mixture thereof.

In one preferred embodiment, the amine curing agent may be selected from one or more hardeners, for example, from aliphatic amines, polyether amines, aromatic amines, cycloaliphatic amines, piperazines, and mixtures thereof.

In another preferred embodiment, the amine curing useful in the present invention can be an aliphatic polyamine including for example, an aliphatic diamine such as methylene diamine, ethylenediamine, 1,2-diaminopropane, 1,3-diaminopropane, 1,4-diaminobutane, 1,5-diamino pentane, 1,6-diamino hexane, 1,7-diamino heptane, 1,8-diamino octane, 1,9-diamino nonane, 1,10-diamino decane, o-xylylene diamine, m-xylylene diamine, p-xylylene diamine or mixtures thereof; a tetra-(aminomethyl)methane such as diethylenetriamine, dipropylene triamine, triethylenetramine, tripropylene tetramine, tetraethylenepentamine, tetrapropylenepentamine, penta ethylene hexamine, nonaethylene decamine; or mixtures thereof; a trimethyl hexamethylenediamine; tetrakis (2-amino ethyl aminomethyl) methane; an aliphatic triamine such as 1,3-bis (2'-amino ethyl amino) propane, triethylene-bis (trimethylene) hexamine, bis (3-amino ethyl) amine, bis-hexamethylene triamine or mixtures thereof; 1,4-cyclohexanediamine; 4,4'-methylene his cyclohexylamine; an alicyclic diamine such as 4,4'-isopropylidene biscyclo hexylamine, norborna diamine, bis (aminomethyl) cyclohexane, diamino dicyclo hexylmethane, isophorone diamine, menthen diamine or mixtures thereof; bis (aminoalkyl) benzene; bis (aminoalkyl) naphthalene; bis (cyanoethyl) diethylenetriamine; phenylenediamine; naphtylene diamine; diamino diphenylmethane; diamino diethyl phenylmethane; 2,2-bis (4-aminophenyl) propane; 4,4'-diamino diphenylether; 4,4'-diamino benzophenone; 4,4'-diamino diphenylether; 4,4'-diaminodiphenyl sulfone; a 2,2'-dimethyl-4,4'-diamino diphenylmethane; 2,4'-diamino biphenyl; 2,3'-dimethyl-4,4'-diamino biphenyl; 3,3'-dimethoxy-4,4'-diamino biphenyl; an aromatic diamine such as bis(aminomethyl) naphthalene, bis (amino ethyl) naphthalene or mixtures thereof; N-methyl piperazine; morpholine; 1,4-bis (8-aminopropyl)-piperazine; a heterocyclic diamine such as piperazine-1,4-diaza cycloheptane, 1-(2'-amino ethyl piperazine), 1-[2'-(2"-amino ethyl amino) ethyl] piperazine, 1,11-diaza cyclo eicosane, 1,15-diaza cyclo octacosane or mixtures thereof; or any combination of two or more of the above aliphatic polyamines.

Generally, the amount of curing agent compound useful in the present invention, may be for example, from about 40 wt % to about 99 wt % in one embodiment, from about 45 wt % to about 95 wt % in another embodiment; from about 50 wt % to about 90 wt % in still another embodiment; and from about 55 wt % to about 85 wt % in yet another embodiment, based on the total weight of the curing agent composition.

The present invention curing agent composition may include optional additives known to the skilled artisan that are not detrimental to the curing agent composition; and other compounds that are normally used in resin formulations known to those skilled in the art for preparing curable compositions and thermosets. For example, the optional components may comprise compounds that can be added to the composition to enhance: application properties (e.g. surface tension modifiers, flow aids, gas release agents, or colorants), reliability properties (e.g. adhesion promoters), reaction rate, selectivity of the reaction, and/or catalyst lifetime; or mixtures thereof.

For example, the curing agent composition can include, as an optional component, one or more of the following compounds: accelerators; catalysts or cure catalysts to facilitate the reaction of an epoxy resin compound with the curing agent composition; diluents; solvents to lower the viscosity of the composition further; de-molding agents; viscosity modifying agents; other phenolic resins; epoxy resin compounds (for example, aromatic and aliphatic glycidyl ethers; cycloaliphatic epoxy resins; and divinylarene dioxides such as divinylbenzene dioxide); other curing agents; fillers; pigments; toughening agents; flow modifiers; adhesion promoters; stabilizers; plasticizers; catalyst de-activators; flame retardants; other additives required for various enduse applications; and mixtures thereof.

Generally, the amount of an optional component, when used in the curable composition of the present invention, may be for example, from 0 wt % to about 40 wt % in one embodiment, from about 0.01 wt % to about 18 wt % in another embodiment; from about 0.1 wt % to about 15 wt % in still another embodiment; and from about 1 wt % to about 10 wt % in yet another embodiment.

In one optional embodiment, a diluent or solvent can be used in the curing agent composition of the present invention. For example, in a preferred embodiment, the curing agent composition of the present invention may include, as a diluent or a solvent, one or more of the following compounds: a nonyl phenol; ethers such as tetrahydrofuran, −1,2-dimethoxyethane, 1,2 diethoxy ethane or mixtures thereof; an alcohol such as an iso- or a normal-butanol, an amyl alcohol, benzyl alcohol, or furfuryl alcohol or mixtures thereof; an aromatic hydrocarbon such as benzene, toluene, xylene or mixtures thereof; a ketone such as methyl isobutyl ketone, methyl ethyl ketone, or mixtures thereof; an ether such as ethylene dichloride, acrylonitrile, methyl tertiary butyl ether, propylene glycol monomethyl ether, or mixtures thereof; an ester such as ethyl acetate, butyl acetate, butyl cellosolve, or mixtures thereof; oil of turpentine; a terpene-hydrocarbon oil such as D-limonene, pinene, or mixtures thereof; a high boiling point paraffin type solvent such as a mineral spirit, Swasol #310 (Cosmo Matsuyama Petroleum Corporation Co., Ltd. IKK), Solvesso #100 (Exxon-Chemical Corporation Co., Ltd. IKK), or mixtures thereof; or any combination of two or more of the above diluents or solvents.

The concentration of the above described optional diluent or solvent, when used in the curing agent composition of the present invention, may range generally from 0 wt % to about 40 wt % in one embodiment, from about 0.1 wt % to about 30 wt % in another embodiment, from about 1 wt % to about 20 wt % in still another embodiment, and from about 2 wt % to about 10 wt % in yet another embodiment, based on the weight of the curable composition.

The process for preparing the curing agent composition of the present invention includes admixing (a) at least one natural oil phenol compound such as cardanol or a cardol from cashew nutshell oil; (b) at least one phenol compound such as a phenol novolac, wherein the melting point of the phenol novolac is less than about 80° C.; and (c) at least one amine curing agent. The components are admixed at sufficient concentrations to form a curing agent composition which can then be used to cure a thermosettable resin such as an epoxy resin. Optionally, other optional ingredients are added to the curing agent composition mixture as needed. For example, the preparation of the curing agent formulation of the present invention is achieved by blending, in known mixing equipment, the natural oil phenol compound, the phenol novolac, the amine curing agent, and optionally any other desirable additives. Any of the above-mentioned optional additives may be added to the composition during the mixing, or prior to the mixing, of the components to form the curing agent composition.

All the compounds of the curing agent composition are typically mixed and dispersed at a temperature enabling the preparation of an effective curing agent composition having the desired balance of properties for a particular application. For example, the temperature during the mixing of all components may be generally from about 25° C. to about 150° C. in one embodiment, and from about 50° C. to about 120° C. in another embodiment.

In a preferred embodiment, the mixing process of the compounds of the curing agent composition requires the use of an inert gas such as nitrogen to provide an inert atmosphere during mixing to prevent oxidation of the phenol groups of the compounds of the mixture.

The preparation of the curing agent composition of the present invention, and/or any of the steps thereof, may be a batch or a continuous process. The mixing equipment used in the process may be any vessel and ancillary equipment well known to those skilled in the art.

The curing agent composition of the present invention advantageously exhibits several advantageous properties. For example, the curing agent composition or formulation provides a curable composition with a fast cure speed. The cure speed of the curable composition can be defined by the Shore D hardness build-up and low viscosity properties of the composition. In one embodiment, the curing agent composition of the present invention exhibits a Shore D hardness build-up property of generally between about 1 and about 90 which is achieved within about 2 hours (hr); a Shore D hardness build-up of between about 2 and about 85 within about 2 hr in another embodiment; and a Shore D hardness build-up of between about 5 and about 80 within about 2 hr in still another embodiment. The cure speed of the curing agent composition can be measured by the method described in ASTM D2240 (2005) with a Shore D hardness tester.

In another embodiment, the curing agent composition of the present invention exhibits a viscosity of generally between about 5 500 mPa·s and about 500 mPa·s; between about 10 mPa·s and about 300 mPa·s in another embodiment; and between about 20 mPa·s and about 200 mPa·s in still another embodiment. The viscosity of the curing agent composition can be measured by the method described in ASTM D7042 (2004) with a rheology meter.

Another embodiment of the present invention is directed to providing a curable resin formulation or composition including a mixture of: (I) at least one epoxide compound; and (II) the curing agent composition as described above. Other optional additives known to the skilled artisan can be included in the curable composition such as for example a curing catalyst and other additives for various enduse applications.

The epoxy compound that is useful as component (I) in the curable composition of the present invention can include a wide variety of epoxy compounds. For example, the curable composition may include at least one epoxy resin compound such as a liquid epoxy resin (LER) as component (I) to form the epoxy matrix in a final curable formulation. In a preferred embodiment, the LER compound can be a low viscosity LER compound. For example, the low viscosity LER compound useful as component (I) in preparing a curable composition of the present invention may include the epoxy compounds described in U.S. Pat. No. 8,497,387; U.S. Provisional Patent Application Ser. No. 61/660,403, filed Jun. 15, 2012, by Maurice Marks; and U.S. Provisional Patent Application Ser. No. 61/718,752, filed Oct. 26, 2012, by Stephanie Potisek et al.; all of which are incorporated herein by reference.

Other polyepoxides that can be used as the epoxy resin compound for the curable composition of the present invention can include for example aliphatic epoxies, cycloaliphatic epoxies, aromatic epoxies, hetero-cyclic epoxies, or mixtures thereof. Desirably, epoxy compounds contain, on the average, one or more reactive oxirane groups. Epoxy resins useful in embodiments may include mono-functional epoxy resins, multi- or poly-functional epoxy resins, and combinations thereof. These epoxy resins and their preparations are disclosed in Lee, H. and Neville, K., *Handbook of Epoxy Resins*, McGraw-Hill Book Company. Commercially available epoxy resins that can be used according to the present invention include, for example, DER331, DEN438, DER671 or DER 852 available from The Dow Chemical Company The epoxy compound used in the curable composition of the present invention may be, for example, a single epoxy compound used alone; or a combination of two or more epoxy compounds known in the art such as any of the epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the epoxy compound may include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy compound may also be selected from commercially available epoxy resin products such as for example, D.E.R. 331®, D.E.R. 332, D.E.R. 354, D.E.R. 580, D.E.N. 425, D.E.N. 431, D.E.N. 438, D.E.R. 736, or D.E.R. 732 epoxy resins available from The Dow Chemical Company. One preferred embodiment of the present invention includes an epoxy resin composition containing at least one liquid diglycidyl ether of bisphenol A.

Generally, the amount of other epoxy compound used in the curable composition of the present invention may be in the range of from about 10 wt % to about 99 wt % of resin forming components (excluding the curing agent compounds) in one embodiment, from about 15 wt % to about 95 wt % in another embodiment; from about 20 wt % to about 93 wt % in still another embodiment; and from about 25 wt % to about 90 wt % in yet another embodiment.

The curing agent composition, useful as component (II) to prepare the curable composition, comprises the curing agent composition described above. Generally, the amount of curing agent composition may be used in a concentration of from about 5 wt % to about 70 wt % in one embodiment, from about 10 wt % to about 60 wt % in another embodiment; from about 15 wt % to about 50 wt % in still another embodiment; and from about 20 wt % to about 40 wt % in yet another embodiment, based on the total curable composition.

In addition to the epoxy compound useful as component (I) and the curing agent composition useful as component (II) described above, the curable resin composition of the present invention, may include one or more various optional compounds. For example, optional compounds that may be added to the curable composition of the present invention may include compounds that are normally used in resin formulations known to those skilled in the art for preparing curable compositions and thermosets. The optional components that can be added to the curable composition may include compounds that enhance the composition's application properties (e.g., surface tension modifiers or flow aids), reliability properties (e.g., adhesion promoters) reaction rate, selectivity of the reaction, and/or catalyst lifetime.

For example, optional compounds that may be added to the curable composition of the present invention may include, a solvent to lower the viscosity of the formulation further, other resins such as a phenolic resin that can be blended with the epoxy resin of the formulation, other epoxy resins different from the epoxy compound of the present invention (for example, aromatic and aliphatic glycidyl ethers; cycloaliphatic epoxy resins; and divinylarene dioxides such as divinylbenzene dioxide), other curing agents, fillers, pigments, toughening agents, leveling assistants, flow modifiers, adhesion promoters, non-reactive diluents, reactive diluents such as at least one aliphatic ether, stabilizers, plasticizers, catalyst de-activators, flame retardants, and mixtures thereof. For example, the solvent that can be added to the curable composition may be selected from ketones, ethers, aromatic hydrocarbons, glycol ethers, cyclohexanone and combinations thereof.

Generally, the amount of the optional component, when used in the present invention, may be for example, from 0 wt % to about 50 wt % in one embodiment, from about 0.01 wt % to about 30 wt % in another embodiment; from about 0.1 wt % to about 20 wt % in still another embodiment; and from about 0.5 wt % to about 10 wt % in yet another embodiment.

In one preferred optional embodiment, for example, at least one cure catalyst can be included in the curable composition to facilitate the reaction of the epoxy resin compound with the curing agent composition, i.e., the curing catalyst may be optionally added to the curable composition to further speed up the curing process of epoxy resin composition if desired. Examples of suitable catalysts useful in the present invention may include tris(dimethylaminomethyl)-phenol, bis(dimethylaminomethyl)-phenol, salicylic acid, bisphenol A, or any combination thereof.

Generally, the amount of cure catalyst, when used in the present invention curable composition, may be used in a concentration of from 0 to about 50 wt % in one embodiment, from about 0.5 wt % to about 40 wt % in another embodiment; from about 1 wt % to about 35 wt % in still another embodiment; and from about 2 wt % to about 30 wt % in yet another embodiment, based on the total curable composition.

The process for preparing the curable composition of the present invention includes admixing (I) at least one epoxide compound; and (II) the curing agent composition as described above to form the curable composition which can be cured to form a thermoset product. Optionally, other optional ingredients are added to the curable composition mixture as needed. For example, the preparation of the curable formulation of the present invention is achieved by blending, in known mixing equipment, the epoxy compound, the curing agent composition, and optionally any other desirable additives. Any of the above-mentioned optional additives may be added to the curable composition during the mixing or prior to the mixing to form the curable composition which is to be cured.

All the compounds of the curable formulation are typically mixed and dispersed at a temperature enabling the preparation of an effective curable epoxy resin composition having the desired balance of properties for a particular application. For example, the temperature during the mixing of all components may be generally from about 25° C. to about 150° C. in one embodiment, and from about 50° C. to about 120° C. in another embodiment. Mixing temperatures lower than about 150° C. help to minimize reaction of the epoxide and hardener in the composition to maximize the pot life of the composition.

The preparation of the curable formulation of the present invention, and/or any of the steps thereof, may be a batch or a continuous process. The mixing equipment used in the process may be any vessel and ancillary equipment well known to those skilled in the art.

The curable epoxy resin composition of the present invention advantageously exhibits several properties including for example anti-blushing prior to curing and after curing. The anti-blushing property of a curing agent composition can be measured using the procedure described below under the subheading "Anti-blushing Test". For example, in one embodiment, the curing agent composition of the present invention exhibits an anti-blushing property of generally between about a category "A" and about a category "B" level as described in the Anti-blushing procedure below.

Another embodiment of the present invention includes a process of curing the curable resin composition containing the curing agent composition of the present invention to form a thermoset (or cured product). For example, the process of curing of the curable composition of the present invention may be carried out at a predetermined temperature and for a predetermined period of time sufficient to cure the composition. The temperature of curing the formulation, for example, may be generally from about 5° C. to about 200° C. in one embodiment; from about 100° C. to about 190° C. in another embodiment; and from about 125° C. to about 175° C. in still another embodiment.

Generally, the curing time of the curable composition may be chosen, for example, between about 1 minute (min) to about 4 hr in one embodiment, between about 5 min to about 2 hr in another embodiment, and between about 10 min to about 1.5 hr in still another embodiment. Below a period of time of about 1 min, the time may be too short to ensure sufficient reaction under conventional processing conditions; and above about 4 hr, the time may be too long to be practical or economical.

The present invention discloses a novel synergistic combination of a natural oil phenol compound such as cardanol or a cardol, a phenol novolac, and an amine curing agent; and use of such combination as a curing agent composition to improve the physical properties of cured epoxy resins. Generally, a cured epoxy resin having the benefit of a balance of properties is obtained. The cured product (i.e., the cross-linked product made from the curable composition) of the present invention shows several improved properties over conventional epoxy cured resins. For example, the cured product of the present invention may advantageously have a suitable glass transition temperature (Tg) particularly suited for a specified end use application. The capability of preparing a cured product with a particular Tg using the process and compositions of the present invention advantageously provides a means for controlling Tg and to vary the Tg to achieve a sufficient and applicable Tg for a specific end use application.

The Tg of the cured product may depend on the curing agent and other additives used in the curable composition. For example, the cured product of the present invention exhibits a Tg of generally between about 20° C. and about 250° C. in one embodiment, between about 30° C. and 230° C. in another embodiment, and between about 40° C. and about 200° C. in still another embodiment. The Tg of the cured product can be measured by the method described in ASTM D3418 (2008).

In another embodiment of the present invention, for example, the cured product exhibits a low amount of blushing. The anti-blushing property of a curable composition can be measured using the procedure described below under the subheading "Anti-Blushing Test". For example, the amount of blushing of the cured product can be minimized by using the curable composition of the present invention; and generally, the amount of blushing of the cured product can be in the range of from about a category "A" level to about a category "B" level as described in the Anti-Blushing Test procedure below.

The curable composition and the cured thermoset product of the present invention may be used in various applications. For example, the curable composition may be used to manufacture a thermoset product in applications including the composites, coatings, adhesives, grouting, and infrastructures industries.

EXAMPLES

The following Examples and Comparative Examples are described herein to illustrate various embodiments of the present invention; and are not intended to limit the scope of the present invention. Unless otherwise stated all parts and percentages in the examples are by weight.

Various terms, designations and materials used in the following examples are explained in as follows:

AIRSTONE™ 720E is a modified epoxy resin in liquid form, having an EEW of about 173, and commercially available from The Dow Chemical Company.

D.E.H™ 39 is 1-piperazine in liquid form, having an AHEW of 43, and commercially available from The Dow Chemical Company.

D.E.H™ 20 is diethylenetriamine in liquid form, having an AHEW of 21, and commercially available from The Dow Chemical Company.

Cashew nutshell oil is cardanol in liquid form.

EXP0154B is a phenol novolac in solid form, having melting point of about 70° C., and commercially available from Shandong Shenquan.

"MXDA" stands for 1,3-benzenedimethanamine, a curing agent in liquid form, and commercially available from Mitsubishi.

"TMD" stands for 2,2,4-trimethylhexamethylenediamine, a curing agent in liquid form, and commercially available from EVONIK.

Jeffamine D230 is a polyether amine curing agent in liquid form, and commercially available from Huntsman.

The following standard analytical equipments and general methods are used in the Examples:

Anti-Blushing Test

A dry timer experiment is leveraged to compare the anti-blushing of different epoxy systems. The test method includes the following:

(1) Sample quantity: 10 g AIRSTONE™ 720E and approximately 10 g curing agent.
(2) Mix ratio: based on stoichiometric calculation.
(3) AHEW*100/EEW=weight of curing agent per 100 g epoxy resin.
   "AHEW" stands for amine hydrogen equivalent weight.
   "EEW" stands for epoxide equivalent weight.
(4) The general procedure for film preparation includes the following steps:
   (a) scratching a coating of a 300 μm wet film on a glass panel using a film-scraper;
   (b) placing the prepared film on dry timer shelves; and controlling the laboratory conditions at 23±2° C. and 50±5% relative humidity; and
   (c) visually observing the film for any blushing of the film that results after at least half an hour (hr).

The anti-blushing performance is calibrated through visual check and recorded as one of the following categories:

Category A: 30 minutes (min) after scratching a film cured on a glass panel, the film is transparent without haze.

Category B: 30 min after scratching a film cured on a glass panel, the film is 50% transparent with light haze.

Category C: 30 min after scratching a film cured on a glass panel, the film is opaque with severe haze.

Shore D Hardness Test

A Shore D hardness experiment is chosen to compare the curing speed of the different epoxy systems. Clear cast samples used in this test are prepared with a thickness of just over about 3 cm thick according to the following general procedure: After mixing the epoxy resin and the curing agent, a 5 g sample of the mixture is poured into an aluminum pan to ensure the resulting thermoset has a thickness of about 3 cm. Then, the samples are placed on a vertical bench and the laboratory conditions are controlled to a temperature of 23±2° C. and a relative humidity of 50±5%. A Shore D hardness meter is used to test the hardness of the samples.

General Blending Procedure for Components of Curing Agent Composition

Except for the samples prepared in Examples 3, 4 and 5; the samples prepared in the remaining examples (Examples 1 and 2, and Comparative Examples A-F) used liquid components. Thus, in the examples using liquid components, a speed mixer apparatus was used to mix the components at 3,000 rpm mix speed for 2 min Then, the resultant mixture was cooled to room temperature (about 25° C.).

For Example 3, the following procedure was conducted to prepare a sample: 210 g of D.E.H.™ 39 and 90 g of EXP0154B were placed in a 1-liter four neck glass flask equipped with a stirrer. The flask was sealed and subsequently purged with nitrogen to remove air from the flask. While stirring the flask contents, the contents were heated to achieve a temperature in the range of 80-90° C. over about 2 hours (hr) to dissolve the solid EXP0154B into D.E.H.™ 39. Then, the flask was cooled to room temperature. The cooled mixture obtained was labeled as Premix-A.

Then, 54 parts of the Premix-A prepared above along with 10.8 parts of cashew nutshell oil, 10 parts of Jeffamine D230, 8 parts of D.E.H.™ 20 and 17.2 parts of D.E.H.™ 39 were poured into a speed mixer bottle, the bottle was covered with a matched bottle cap and then the capped bottle was placed into a speed mixer. The speed mixer was started and the contents of the bottle were mixed at 3000 rpm for 2 min to form the resultant sample of Example 3.

For Example 4 and Example 5, the above similar procedure used for Example 3, was conducted with the respective specific parts of components shown in Table II to prepare the samples.

General Blending Procedure for an Epoxy Resin with Curing Agent Composition

All of the curable composition samples in the present application were prepared with a mix ratio based on stoichiometric calculation of epoxy and curing agent. The following calculation formula was used:

AHEW*100/EEW=weight of curing agent per 100 g epoxy resin.

In each of the Examples, 10 parts of AIRSTONE™ 720E and 3.1 parts of each of the curing agent compositions of the Examples were added into a 100 ml speed mixer bottle, and then the bottle was capped. The capped bottle was then mixed in a speed mixer at 3000 rpm for 1 min. The curable composition was prepared using the curing agent composition of Example 3.

The other curable composition samples were prepared using the above similar procedure based on the stoichiometric mix ratio for the specific Example.

General Procedure for Curing Thermoset

For this procedure, 5 g of curable composition of each of the above Examples was poured into an aluminum pan to prepare a sample film 3 cm in thickness. Then, the samples were placed in a vertical bench and the laboratory conditions were adjusted and controlled to a temperature of 23±2° C. and a humidity of 50±5% relative humidity. After 2 hr, a solid thermoset sample was prepared. Then, the solid sample was placed in an oven and heated at 70° C. for 10 hr such that a substantially fully cured thermoset sample was prepared.

Examples 1 and 2 and Comparative Example A, B, C, and D

Examples 1 and 2 and Comparative Examples A, B, C, and D were carried out using the general procedures described above. The epoxy systems in Examples 1 and 2 include a mixture of cardanol and D.E.H.™ 39 as a curing agent composition. The resulting curing agent composition is used to react with an epoxy resin, AIRSTONE™ 720E, with equal stoichiometric amounts of curing agent composition and epoxy compound as described in Table I.

The epoxy system in Example 1 includes a mixture of 10% cardanol and 90% D.E.H.™ 39 as the curing agent composition.

The epoxy system in Example 2 includes a mixture of 30% cardanol and 70% D.E.H.™ 39 as the curing agent composition.

The epoxy systems in Comparative Examples A, B, C, and D include various different individual amines as the curing agent which is reacted with AIRSTONE™ 720E.

TABLE I

Anti-Blushing Results

| | Comparative Example A | Comparative Example B | Comparative Example C | Comparative Example D | Example 1 | Example 2 |
|---|---|---|---|---|---|---|
| AIRSTONE ™ 720E | 10.00 | 10.00 | 10.00 | 10.00 | 10.00 | 10.00 |
| MXDA | 2.00 | | | | | |
| TMD | | 2.30 | | | | |
| D.E.H. (TM) 20 | | | 1.20 | | | |
| D.E.H. (TM) 39 | | | | 2.50 | 2.52 | 2.52 |
| Cardanol | | | | | 0.28 | 1.08 |
| Anti-blushing category | C | A | C | C | B | A |

As indicated in Table I above, the epoxy system in Example 1 shows better anti-blushing results than Comparative Examples A, C and D. Example 2 shows an excellent anti-blushing property similar to Comparative Example B.

Examples 3, 4 and 5 and Comparative Examples E and F

Examples 3, 4, and 5 and Comparative Examples E and F were carried out using the general procedures described above. Generally, in Examples 3, 4, and 5, a mixture of cardanol, novolac and curing agent was used; in Comparative Example E, neither cardanol nor novolac was used; and in Comparative Example F, a mixture of cardanol and curing agent was used. As described in Table II, the following more specific mixtures were used in the Examples and Comparative Examples:

Example 3 used a mixture of 10.8% cardanol, 16.2% EXP0154B, 10% Jeffamine D230, 55% D.E.H.™ 39, and 8% D.E.H.™ 20 as the curing agent composition of the present invention.

Example 4 used a mixture of 13.5% cardanol, 13.5% EXP0154B, 10% Jeffamine D230, 55% D.E.H.™ 39 and 8% D.E.H.™ 20 as the curing agent composition of the present invention.

Example 5 used a mixture of 18.9% cardanol, 8.1% EXP0154B, 10% Jeffamine D230, 55% D.E.H.™ 39 and 8% D.E.H.™ 20 as the curing agent composition of the present invention.

Comparative Example E used a mixture of 13.7% Jeffamine D230, 75.34% D.E.H.™ 39 and 10.96% D.E.H.™ 20 as a curing agent.

Comparative Example F used a mixture of 27% cardanol, 10% Jeffamine D230, 55% D.E.H.™ 39 and 8% D.E.H.™ 20 as a curing agent.

The results of the Examples and Comparative Examples are described in Table III wherein the epoxy system in Example 3 shows a better anti-blushing property than compared to Comparative Example E; and Example 3 indicates a much faster Shore D hardness build-up (85) at 2 hr compared to Comparative Example E which is still sticky at 2 hr.

The epoxy system in Example 4 also shows better anti-blushing compared to Comparative Example E; and Example 4 indicates a faster Shore D hardness build-up (75) at 2 hr compared to Comparative Example E which is still sticky at 2 hr.

The epoxy system in Example 5 also shows much better anti-blushing compared to Comparative Example E; and Example 5 indicates a faster Shore D hardness build-up (65) at 2 hr compared to Comparative Example E which is still sticky at 2 hr.

The epoxy system in Example 3, 4 and 5 indicates a faster Shore D hardness build-up at 2 hr and 3 hr compared to Comparative Example F which is still sticky at 2 hr and 3 hr.

TABLE III

Anti-Blushing and Shore D Test Results

| Example | Anti-Blushing Category | Shore D Hardness (at 25° C. after 2 hours) | Shore D Hardness (at 25° C. after 3 hours) |
|---|---|---|---|
| Comparative Example E | C | still sticky | 5 |
| Comparative Example F | A | still sticky | still sticky |
| Example 3 | B | 85 | 87 |

TABLE II

| | Example 3 | Example 4 | Example 5 | Comparative Example E | Comparative Example F |
|---|---|---|---|---|---|
| AIRSTONE ™ 720E (g) | 100.000 | 100.000 | 100.000 | 100.000 | 100.000 |
| Jeffamine D230 (g) | 3.100 | 3.100 | 3.100 | 3.150 | 3.100 |
| D.E.H. ™ 39 (g) | 17.050 | 17.050 | 17.050 | 17.330 | 17.050 |
| D.E.H. ™ 20 (g) | 2.480 | 2.480 | 2.480 | 2.520 | 2.480 |
| Cardanol (g) | 3.348 | 4.185 | 5.859 | n/a | 8.370 |
| EXP0154B (g) | 5.022 | 4.185 | 2.511 | n/a | n/a |
| Total (g) | 131.000 | 131.000 | 131.000 | 123.000 | 131.00 |

TABLE III-continued

Anti-Blushing and Shore D Test Results

| Example | Anti-Blushing Category | Shore D Hardness (at 25° C. after 2 hours) | Shore D Hardness (at 25° C. after 3 hours) |
|---|---|---|---|
| Example 4 | B | 75 | 85 |
| Example 5 | A | 65 | 75 |

As shown in Table III, a curing agent composition of the present invention containing components such as cardanol can help to significantly improve the anti-blushing property of an epoxy curable composition and a thermoset made therefrom; and as the cardanol content of the curing agent composition is increased, the better anti-blushing properties are observed. The results in Table III also show that a curing agent composition of the present invention containing components such as phenol-novolac provides a curable composition with an extremely fast Shore D hardness build-up capability. In other words, the curing agent composition of the present invention provides a curable epoxy resin composition that exhibits an extremely fast cure speed at ambient temperature and better anti-blushing properties compared with other conventional curable compositions with conventional curing agents. Therefore, the curing agent composition of the present invention can be advantageously used in composite, infrastructure and other applications requiring anti-blushing and fast cure properties during operation.

The invention claimed is:

1. A curing agent composition for curing an epoxy compound comprising, based on the total weight of the curing agent composition, a mixture of:
   (a) about 0.1 to about 50 wt % of at least one natural oil phenol compound,
   (b) about 0.1 to about 50 wt % of at least one phenolic resin compound, and
   (c) about 40 to about 99 wt % of at least one amine crosslinking agent comprising an aliphatic amine, a polyether amine, an aromatic amine, a cycloaliphatic amine, a piperazine, or a mixture thereof;
   wherein epoxy resin compounds are excluded from the curing agent composition.

2. The curing agent composition of claim 1, wherein the at least one natural oil phenol compound is a natural oil phenol compound comprising three different functional groups including an aromatic ring, at least one hydroxyl group attached to at least one position on the aromatic ring and an alkyl chain from $C_9$-$C_{20}$ attached to at least one position on the aromatic ring.

3. The curing agent composition of claim 1, wherein the natural oil phenol compound is selected from the group consisting of a phenolic lipid, urushiol, cardol, cardanol, or mixtures thereof.

4. The curing agent composition of claim 1, wherein the at least one natural oil phenol compound is at least one cardanol or cardol from cashew nutshell oil; and the cardanol or cardol is one or more of the compounds illustrated by Structures (I) and (I) as follows:

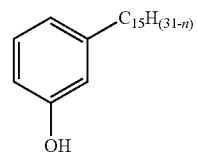

Structure (I)

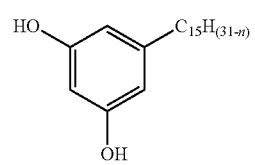

Structure (II)

where n, in Structures (I) and (II) above, is 0, 2, 4 or 6, which depends upon whether the side chain is saturated or unsaturated.

5. The curing agent composition of claim 1, wherein the at least one phenolic resin compound is a phenol formaldehyde resin obtained by reacting a phenol or a substituted phenol with formaldehyde.

6. The curing agent composition of claim 1, wherein the at least one phenolic resin compound is a resol novolac, phenol novolac, cresol novolac, bisphenol-A novolac, a multi-functional novolac, or a mixture thereof.

7. The curing agent composition of claim 1, wherein the at least one phenolic resin compound is a phenol novolac illustrated by Structure (III) as follows:

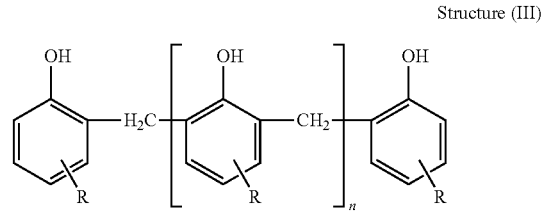

Structure (III)

where, in Structure (III), R is hydrogen or a $C_1$-$C_3$ alkyl; and n is in the range of 1<n≤2.

8. The curing agent composition of claim 1, wherein a curable epoxy resin composition comprising the curing agent composition has a Shore D hardness build-up greater than 0 after within 2 hours at 23±2° C. and has an anti-blushing property such that 30 minutes after scratching a film comprising the curable epoxy resin composition cured on a glass panel, the film is at least 50 percent transparent.

9. A two-component curable composition comprising:
   as component (I), about 30 to about 95 wt %, based on the total weight of the curable composition, of at least one epoxy compound; and
   as component (II), about 5 to about 70 wt % based on the total weight of the curable composition, of at least one curing agent composition, wherein the curing agent composition comprises, based on the total weight of the curing agent composition, a mixture of:
   (a) about 0.1 to about 50 wt % of at least one natural oil phenol compound,
   (b) about 0.1 to about 50 wt % of at least one phenolic resin compound, and
   (c) about 40 to about 99 wt % of at least one amine crosslinking agent comprising an aliphatic amine, a polyether amine, an aromatic amine, a cycloaliphatic amine, a piperazine, or a mixture thereof,
   wherein epoxy resin compounds are excluded from component (II).

10. The two-component curable composition of claim 9, wherein the epoxide compound comprises a liquid epoxy resin.

11. The two-component curable composition of claim 9, including at least one curing catalyst.

12. The two-component curable composition of claim 9, including a second curing agent separate and different from the curing agent composition (II), a filler, a reactive diluent, a flexibilizing agent, a processing aide, a toughening agent, or a mixture thereof.

13. The two-component curable composition of claim 9 comprising:
as component (I), about 60 to about 80 wt %, based on the total weight of the curable composition, of the at least one epoxy compound; and
as component (II), about 20 to about 40 wt %, based on the total weight of the curable composition, of the at least one curing agent composition, wherein the curing agent composition comprises, based on the total weight of the curing agent composition, a mixture of:
(a) about 5 to about 30 wt % of the at least one natural oil phenol compound,
(b) about 5 to about 35 wt % of the at least one phenolic resin compound, and
(c) about 55 to about 85 wt % of the at least one amine crosslinking agent;
wherein epoxy resin compounds are excluded from component (II).

14. A process for preparing a curing agent composition comprising admixing, based on the total weight of the curing agent composition:
(a) about 0.1 to about 50 wt % of at least one natural oil phenol compound,
(b) about 0.1 to about 50 wt % of at least one phenolic resin compound, and
(c) about 40 to about 99 wt % of at least one amine crosslinking agent comprising an aliphatic amine, a polyether amine, an aromatic amine, a cycloaliphatic amine, a piperazine, or a mixture thereof;
wherein epoxy resin compounds are excluded from the curing agent composition.

15. The process of claim 14, wherein a curable epoxy resin composition comprising the curing agent composition has a Shore D hardness build-up greater than 0 after within 2 hours at 23±2° C. and has an anti-blushing property such that 30 minutes after scratching a film cured on a glass panel, the film is at least 50 percent transparent.

16. A process for preparing a curable composition comprising admixing:
(I) at least one epoxy compound; and
(II) at least one curing agent composition, wherein the curing agent composition comprises, based on the total weight of the curing agent composition, a mixture of:
(IIa) about 0.1 to about 50 wt % of at least one natural oil phenol compound,
(IIb) about 0.1 to about 50 wt % of at least one phenolic resin compound, and
(IIc) about 40 to about 99 wt % of at least one amine curing agent comprising an aliphatic amine, a polyether amine, an aromatic amine, a cycloaliphatic amine, a piperazine, or a mixture thereof;
wherein epoxy resin compounds are excluded from the curing agent composition.

17. A process for preparing a thermoset comprising:
(i) admixing:
(I) at least one epoxy compound; and
(II) at least one curing agent composition, wherein the curing agent composition comprises, based on the total weight of the curing agent composition, a mixture of:
(IIa) about 0.1 to about 50 wt % of at least one natural oil phenol compound,
(IIb) about 0.1 to about 50 wt % of at least one phenolic resin compound, and
(IIc) about 40 to about 99 wt % of at least one amine crosslinking agent comprising an aliphatic amine, a polyether amine, an aromatic amine, a cycloaliphatic amine, a piperazine, or a mixture thereof;
wherein epoxy resin compounds are excluded from the curing agent composition; and
(ii) curing the mixture of (I) and (II) of step (i).

18. The process of claim 17, wherein the curing step (ii) is carried out at a temperature of from about 10° C. to about 200° C.

19. A cured thermoset article prepared by the process of claim 17.

20. The cured thermoset article of claim 19 comprising a coating, composite, a potting composite, or an infrastructure composite.

21. A curing agent composition for curing an epoxy compound consisting essentially of, based on the total weight of the curing agent composition, a mixture of:
(a) about 0.1 to about 50 wt % of at least one natural oil phenol compound,
(b) about 0.1 to about 50 wt % of at least one phenolic resin compound, and
(c) about 40 to about 99 wt % of at least one amine crosslinking agent comprising an aliphatic amine, a polyether amine, an aromatic amine, a cycloaliphatic amine, a piperazine, or a mixture thereof.

\* \* \* \* \*